United States Patent
Yang et al.

(10) Patent No.: US 10,968,124 B2
(45) Date of Patent: Apr. 6, 2021

(54) METHOD FOR CHANGING FILLER POLLUTANT ACCUMULATION OF CONSTRUCTED WETLAND

(71) Applicant: Dalian University of Technology, Panjin (CN)

(72) Inventors: Qiao Yang, Panjin (CN); Minhui Liu, Panjin (CN); Chao Gao, Panjin (CN); Shengna Liang, Panjin (CN)

(73) Assignee: Dalian University of Technology, Panjin (CN)

( * ) Notice: Subject to any disclaimer, the term of this patent is extended or adjusted under 35 U.S.C. 154(b) by 0 days.

(21) Appl. No.: 16/679,511

(22) Filed: Nov. 11, 2019

(65) Prior Publication Data

US 2021/0009450 A1   Jan. 14, 2021

(30) Foreign Application Priority Data

Jul. 12, 2019 (CN) .......................... 201910630369.3

(51) Int. Cl.
*C02F 3/00* (2006.01)
*C02F 3/32* (2006.01)
*H01M 8/16* (2006.01)

(52) U.S. Cl.
CPC .............. *C02F 3/006* (2013.01); *C02F 3/005* (2013.01); *C02F 3/327* (2013.01); *H01M 8/16* (2013.01)

(58) Field of Classification Search
CPC .......... C02F 3/006; C02F 3/327; C02F 3/005; H01M 8/16
USPC ....... 210/602, 615, 616, 617, 170.03, 747.1, 210/747.2, 747.3
See application file for complete search history.

(56) References Cited

U.S. PATENT DOCUMENTS

| 2012/0132521 A1* | 5/2012 | Silver ...................... C02F 3/28 204/252 |
| 2015/0349350 A1* | 12/2015 | Liu ..................... H01M 4/8668 429/2 |
| 2019/0039931 A1* | 2/2019 | Major ...................... C02F 9/00 |

FOREIGN PATENT DOCUMENTS

WO   WO 2019/091178 A1 *  5/2019
WO   WO 2020/041894 A1 *  3/2020

* cited by examiner

*Primary Examiner* — Fred Prince
(74) *Attorney, Agent, or Firm* — Blank Rome LLP

(57) ABSTRACT

A method for changing filler pollutant accumulation of a constructed wetland belongs to the field of environmental protection engineering. A coupling device of a microbial fuel cell and a constructed wetland is constructed by using active carbon as a constructed wetland filler, and pond sewage enters into the constructed wetland from the top of the device in an intermittent mode. A titanium mesh is taken as an electron collector for packaging a cathode of the active carbon filler by using the characteristic that electrons are collected by the titanium mesh in a concentrated mode, after stable operation for a period of time, active carbon close to a water surface and active carbon close to the bottom of the titanium mesh are taken out for carrying out specific surface area and biomass measurement, and the accumulation distribution condition of filler pollutants inside the constructed wetland is analyzed.

6 Claims, 1 Drawing Sheet

US 10,968,124 B2

METHOD FOR CHANGING FILLER POLLUTANT ACCUMULATION OF CONSTRUCTED WETLAND

RELATED APPLICATION

This application claims benefit of priority of China Patent Application No. 201910630369.3, filed Jul. 12, 2019, entitled: METHOD FOR CHANGING FILLER POLLUTANT ACCUMULATION OF CONSTRUCTED WETLAND. The above-identified, related application is incorporated herein by reference in its entirety.

FIELD OF USE

The present invention belongs to the field of environmental protection engineering, and relates to a method for changing filler pollutant accumulation in the water treatment process of a constructed wetland.

BACKGROUND OF THE INVENTION

Constructed wetland is a technology for treating sewage by using physical, chemical and biological synergistic effects of soil, artificial mediums, plants and microorganisms. The constructed wetland has the advantages of small investment, low energy consumption, convenient management and the like, and has already been widely applied to the aspects of sewage treatment, environmental improvement and the like. However, along with the operation of the constructed wetland, solid suspended matters and newly grown microorganisms can be accumulated gradually among the gaps of the filler, if the maintenance is improper, the phenomena of sedimentation and blockage are extremely easy to generate, the treatment effect of the wetland is reduced, the service life of the wetland is shortened, the adsorption capacity of the substrate generally tends to saturation, and the treatment effect of the wetland also can be influenced.

The patent application document with the Chinese patent application number of CN201710350173.X discloses a method for relieving tiller pollutants of the constructed wetland by using a bioelectrochemical principle, a bioelectrochemical auxiliary constructed wetland system is constructed in the method, oil extraction sewage gets through a small system with the volume of 2.3 L in a continuous flow rising mode, the change condition of filler pollutants is analyzed by measuring the specific surface area of the active carbon, the filler pollutants of the constructed wetland are relieved in the continuous flow small system with the volume of only 2.3 L in the method, and biological and nonbiological influences in filler pollution are not distinguished.

SUMMARY OF THE INVENTION

Aiming at the problem that pollutants are accumulated at different positions of a filler inside an existing constructed wetland, the present invention provides a method for changing filler pollutant accumulation of a constructed wetland. The method makes full use of the characteristic that electrons are collected by a titanium mesh in a concentrated mode, the active carbon filler is packaged with the titanium mesh, the accumulation distribution condition of pollutants in gaps of active carbon is changed by using the effect of an electric field, and a protective effect is achieved for the filler close to the titanium mesh.

In order to solve the problem, the technical proposal of the present invention is as follows:

a method for changing filler pollutant accumulation of a constructed wetland is provided, where the method is realized based on a coupling system of a microbial fuel cell and a constructed wetland, and the coupling system includes an anode, an electron collection filler cathode, a constructed wetland emergent aquatic plant and an external circuit. The anode is a graphite plate 1, and is buried in zeolite 2. The electron collection filler cathode is a titanium mesh 5, and the titanium mesh 5 is square with an opening at the top thereof and is positioned above the zeolite 2 for packaging a filler layer. The filler layer is filled with columnar active carbon 3 particles with the diameters of 4 to 6 mm. A titanium mesh tube 4 filled with active carbon particles is placed at the middle position of the filler layer and is used for sampling and measuring pollution; and the constructed wetland emergent aquatic plant is planted on the filler layer. The constructed wetland emergent aquatic plant is Myriophyllum aquatic 6. The external circuit is connected with a titanium wire, the anode and the cathode are connected, and a resistor 7 of 1000 ohms is loaded to form a closed loop. The titanium wire is packaged through a silicone tube to prevent from being in contact with the titanium mesh to cause a short circuit.

The method is based on the coupling system, uses a microbial fuel cell to change the tiller pollutant accumulation of the constructed wetland, and includes the following steps:

step 1, constructing a coupling system of a microbial fuel cell and a constructed wetland:

On meter scale, the coupling system of a microbial fuel cell and a constructed wetland is constructed, and inoculation is carried out on the coupling system with pond water so that microorganisms are adhered to the graphite plate I to generate an electricity generation biological film. Pond water enters into the coupling system from the top of the device in an intermittent mode, sewage firstly goes through an active carbon filler layer 3 to adsorb and intercept larger suspended particles, then goes through the titanium mesh 5 and then goes through a zeolite layer to reach the anode, soluble organic matters are mainly degraded by electricity generation microorganisms at the anode, and electrons and protons are generated. The electrons are transmitted to the cathode through the external circuit, and the protons going through the zeolite to reach the cathode are combined with the electrons and oxygen to form water, so that a cathode reduction reaction is completed. The maximum voltage of 450 mV appears 27 days later, and the coupling system can operate stably, so that the electricity generation biological film is formed, and the coupling system is started successfully. The voltage at two ends of the resistor is measured every day by using a multimeter, and the water quality is measured once every three days.

step 2, performing stable operation of the coupling system and measuring active carbon samples:

After the coupling system is started successfully, pond sewage is supplemented once every seven to ten days so that a water surface reaches an initial water surface. No water outlet is formed in the device, and water is reduced by evaporation mainly. After the system operates for four months, an active carbon sample at the bottom inside the titanium mesh tube, namely at the position close to the titanium mesh, and an active carbon sample on a near-surface layer, namely at the position close to the water surface, are taken out for carrying out specific surface area and biomass measurement so as to obtain the accumulation distribution condition of pollutants inside the constructed wetland.

The present invention has the beneficial effects that the present invention makes full use of the characteristic that electrons are collected by the titanium mesh in the concentrated mode, the active carbon filler is packaged with the titanium mesh, the accumulation distribution condition of pollutants inside the constructed wetland is changed by using the effect of the electric field, and the protective effect is achieved for the filler dose to the titanium mesh.

In the figures, 1 graphite plate, 2 zeolite, 3 active carbon, 4 titanium mesh tube, 5 titanium mesh, 6, Myriophyllum aquaticum, and 7 resistor.

DETAILED DESCRIPTION OF THE ILLUSTRATED EMBODIMENTS

The following further describes specific embodiments of the present invention with reference to the following accompanying drawings.

Embodiment 1

Figure 1:
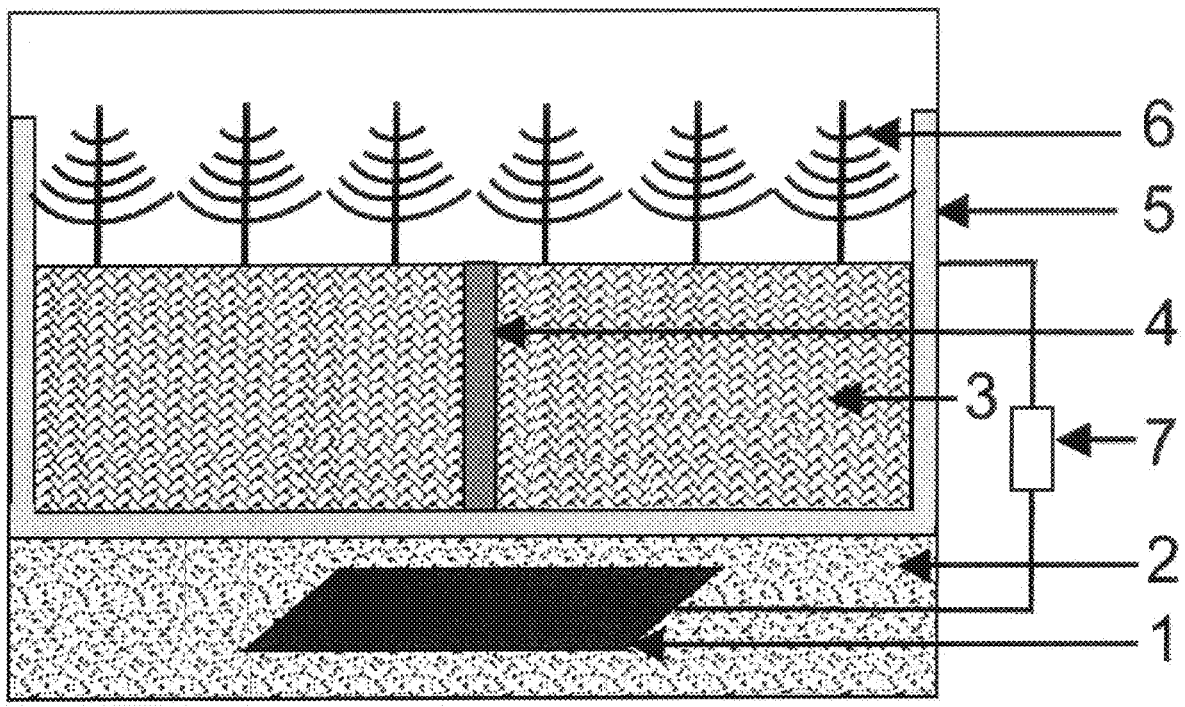
FIG. 1 is a structure diagram of a coupling system of a microbial fuel cell and a constructed wetland of the present invention.

A method for changing filler pollutant accumulation of a constructed wetland is provided, where a coupling system of a microbial fuel cell and a constructed wetland is firstly constructed in the method, and the device is constructed on meter scale, and comprises an anode, an electron collection filler cathode, a constructed wetland emergent aquatic plant and an external circuit, As shown in FIG. 1, the anode is a graphite plate 1, and is buried in zeolite 2. The electron collection filler cathode is a titanium mesh 5, and the titanium mesh 5 is square with an opening at the top thereof and is positioned above the zeolite 2 for packaging a filler layer. The filler layer is filled with columnar active carbon 3 particles with the diameters of 4 to 6 mm. A titanium mesh tube 4 filled with active carbon particles is placed at the middle position of the filler layer and is used for sampling and measuring pollution. The constructed wetland emergent aquatic plant is Myriophyllum aquaticum 6. The external circuit is connected with a titanium wire, the anode and the cathode are connected, and a resistor 7 of 1000 ohms is loaded to form a closed loop. The titanium wire is packaged through a silicone tube to prevent from being in contact with the titanium mesh to cause a short circuit. Inoculation is carried out on the coupling system with pond water so that microorganisms are adhered to the graphite plate 1 to generate an electricity generation biological film. Pond water enters into the coupling system from the top of the device in an intermittent mode, sewage firstly goes through an active carbon filler layer 3 to adsorb and intercept larger suspended particles, then goes through the titanium mesh 5 and then goes through a zeolite layer to reach the anode, soluble organic matters are mainly degraded by electricity generation microorganisms at the anode, and electrons and protons are generated. The electrons are transmitted to the cathode through the external circuit, and the protons going through the zeolite to reach the cathode are combined with the electrons and oxygen to form water, so that a cathode reduction reaction is completed. The maximum voltage of 450 mV appears 27 days later, and the coupling system can operate stably, so that the electricity generation biological film is formed, and the coupling system is started successfully. The voltage at two ends of the resistor is measured every day by using a multimeter, and pond sewage is supplemented once every seven to ten days so that a water surface reaches an initial water surface. No water outlet is formed in the device, and water is reduced by evaporation mainly. After the system operates for four months, the active carbon sample at the bottom inside the titanium mesh tube, namely at the position close to the titanium mesh, and the active carbon sample on a near-surface layer, namely at the position close to the water surface, are taken out for carrying out specific surface area and biomass measurement so as to obtain the accumulation distribution condition of pollutants inside the constructed wetland.

Control Example 1

Figure 2:
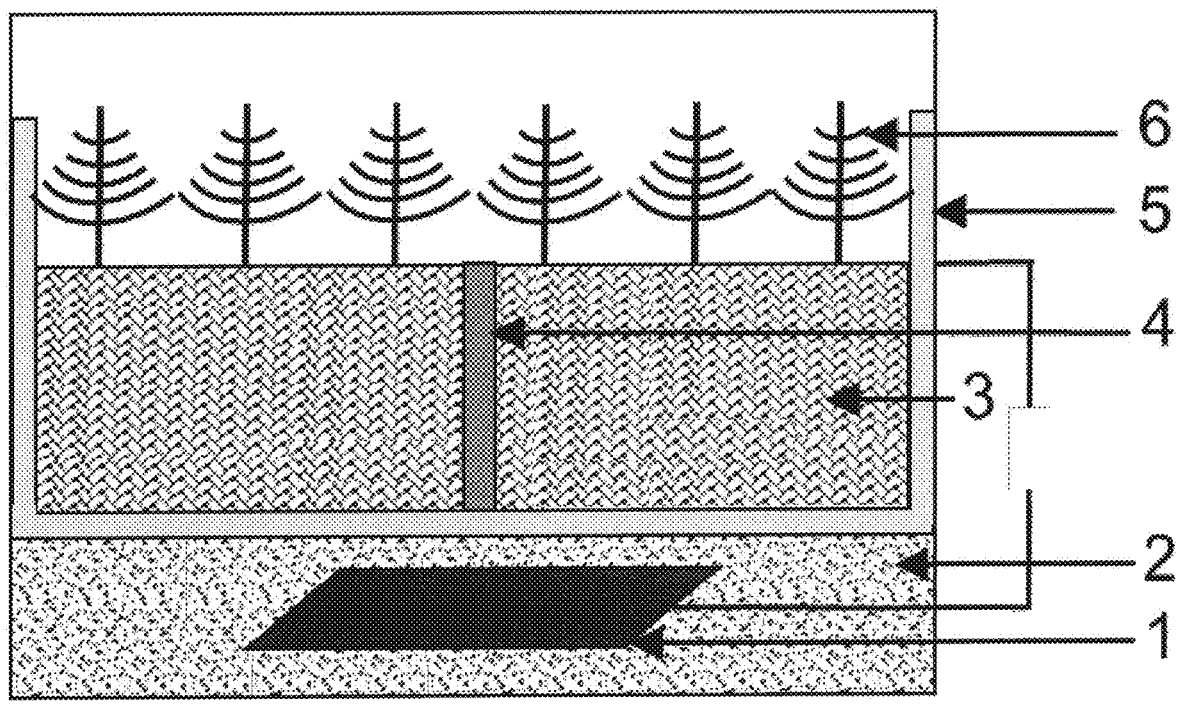
FIG. 2 is a structure diagram of a control group constructed wetland device of the present invention.

The structure and size of a constructed wetland system in a control group are the same as those of the coupling system, but a closed loop is not formed in the constructed wetland system (a real environment is simulated). A constructed wetland device comprises an anode, an electron collection filler cathode and a constructed wetland emergent aquatic plant. As shown in FIG. 2, the anode is a graphite plate 1, and is buried in zeolite 2. The electron collection filler cathode is a titanium mesh 5, and the titanium mesh 5 is square with an opening at the top thereof and is positioned above the zeolite 2 for packaging a filler layer. The filler layer is filled with columnar active carbon 3 particles with the diameters of 4 to 6 mm. A titanium mesh tube 4 filled with active carbon particles is placed at the middle position of the filler layer and is used for sampling and measuring pollution. The constructed wetland emergent aquatic plant is Myriophyllum aquaticum 6. Inoculation is carried out on the constructed wetland device with pond water so that microorganisms are adhered to the graphite plate 1 to generate an electricity generation biological film. The pond water enters into the coupling system from the top of the device in the intermittent mode, and sewage firstly goes through the active carbon filler layer 3 to adsorb and intercept larger suspended particles, then goes through the titanium mesh 5 and then goes through a zeolite layer to reach the anode. Pond sewage is supplemented once every seven to ten days so that a water surface reaches an initial water surface. No water outlet is formed in the device, and water is reduced by evaporation mainly. After the system operates for four months, an active carbon sample at the bottom inside the titanium mesh tube, namely at the position close to the titanium mesh, and an active carbon sample on a near-surface layer, namely at the position close to the water surface, are taken out for carrying out specific surface area and biomass measurement so as to obtain the accumulation distribution condition of pollutants inside the constructed wetland.

Analysis Conclusion

The COD concentration of the pond water is 132 mg/L, the concentrations of ammonia nitrogen, nitrate nitrogen, nitrite nitrogen and total phosphorus are 0.01 mg/L, 0.46 mg/L, 0.21 mg/L and 0.03 mg/L, respectively, and along with the operation of a reactor, the main pollutants are degraded gradually. After four months of operation, the specific surface areas of the active carbon samples in the constructed wetland system in the control group and the coupling system in Embodiment 1 are tested by using a full-automatic physical absorption instrument, the specific surface areas of active carbon on the near-surface layer and the bottom of the constructed wetland in the control group are 819.0+/−12.5 m$^2$/g and 810.6+/−4.0 m$^2$/g, and the specific surface areas of active carbon on the near-surface layer and the bottom in the constructed wetland coupling system are 749.5+/−2.1 m$^2$/g and 928.4+/−12.0 m$^2$/g. A larger specific surface area means fewer pollutants inside filler holes. Through contrast, it is observed that the specific surface area of the active carbon at the bottom of the coupling system in Embodiment 1 is larger than that of the active carbon at the bottom of the constructed wetland system in the control group, so that there are fewer pollutants at the bottom of the filler in the coupling system than those in the constructed wetland system. The specific surface area of the active carbon on the near-surface layer of the coupling system in Embodiment 1 is smaller than that of the active carbon on the near-surface layer of the constructed wetland system in the control group, so that there are more pollutants on the near-surface layer of the filler in the coupling system in Embodiment 1 than those in the constructed wetland system in the control group.

Inside the constructed wetland system of the control group, the cumulative distribution of pollutants inside the filler on the near-surface layer and inside the filler at the bottom is relatively uniform, however, inside the coupling system of Embodiment 1, the pollutants are mainly accumulated inside the filler on the near-surface layer, and fewer pollutants are accumulated inside the filler at the bottom. It is because that, inside the coupling system of Embodiment 1, the titanium mesh is used for packaging the active carbon filler and collecting electrons in a concentrated mode, repulsive force is generated with the suspended particles and microorganisms with negative charges, and the cumulative distribution condition of the pollutants is changed. The repulsive forces at different heights of a cathode region are different, the repulsive force for the pollutants inside the filler close to the titanium mesh is the maximum, the accumulation of the pollutants is the least, and therefore, a certain extent of protective effect is achieved for the filler here.

The biomass for the surface of the filler is analyzed, and the biomasses of the fillers on the near-surface layer and at the bottom of the coupling system in Embodiment 1 are 0.021 ng/g and 0.010 ng/g respectively. The biomasses of the fillers on the near-surface layer and at the bottom of the constructed wetland system in the control group are 0.048 ng/g and 0.026 ng/g respectively, and it is observed that few biomass is accumulated inside the coupling system, and the biological accumulation of the fillers at the bottom inside the constructed wetland system and the coupling system is smaller than that of the filler on the near-surface layer. No water outlet is formed in the two systems respectively, and energy is accumulated after entering into the systems. In the coupling system, compared with the constructed wetland system, a part of energy is output in an electric energy form, so that the accumulation of energy is reduced, and fewer biomass is accumulated. That is to say, after the closed loop is formed by using the method of the present invention, the accumulation condition of pollutants inside the constructed wetland can be changed by using the effect of an electric field generated by electrons collected by the titanium mesh while electricity is generated and sewage is treated.

The above-mentioned embodiments are only illustrative of the present invention, and cannot be construed as a limitation to the scope of the present invention. It should he noted that those skilled in the art can make several modifications and improvements without departing from the inventive concept, and all these modifications and improvements shall still fall within the protection scope of the present invention.

What is claimed is:

1. A method for changing filler pollutant accumulation of a constructed wetland, wherein a coupling system of a microbial fuel cell and a constructed wetland is firstly constructed, and the coupling system comprises an anode, an electron collection filler cathode, a constructed wetland emergent aquatic plant and an external circuit; the anode is a graphite plate (1), and is buried in zeolite (2); the electron collection filler cathode is a titanium mesh (5), and the titanium mesh (5) is square with an opening at the top thereof and is positioned above the zeolite (2) for packaging a filler layer; the filler layer is filled with columnar active carbon (3) particles; a titanium mesh tube (4) filled with active carbon particles is placed at the middle position of the filler layer and is used for sampling and measuring pollution, and the constructed wetland emergent aquatic plant is planted on the filler layer; the external circuit is connected with a titanium wire, the anode and the cathode are connected, and a closed loop is formed by a loaded resistor (7), wherein the method is based on the coupling system, uses a microbial fuel cell to change the filler pollutant accumulation of the constructed wetland, and comprises the following steps:

step 1, constructing a coupling system of a microbial fuel cell and a constructed wetland, and starting the coupling system:

a coupling device of a microbial fuel cell and a constructed wetland is constructed, and inoculation is carried out on the coupling device with pond water so that microorganisms are adhered to the graphite plate (1) to generate an electricity generation biological film; pond water enters into the coupling device from the top of the device in an intermittent mode, sewage firstly goes through an active carbon filler layer to adsorb and intercept suspended particles, then goes through the titanium mesh (5) and then goes through a zeolite layer to reach the anode, soluble organic matters are mainly degraded by electricity generation microorganisms at the anode, and electrons and protons are generated; the electrons are transmitted to the cathode through the external circuit, and the protons going through the zeolite to reach the cathode are combined with the electrons and oxygen to form water, so that a cathode reduction reaction is completed;

when a maximum voltage appears and the coupling device can operate stably, an electricity generation biological film is formed, and the coupling system is started successfully; the voltage at two ends of the resistor is measured every day, and the water quality is measured once every three days;

step 2, performing stable operation of the coupling system and measuring active carbon samples:

after the coupling system is started successfully, pond sewage is supplemented once every seven to ten days so that a water surface reaches an initial water surface; no water outlet is formed in the device, and water is reduced by evaporation mainly; after the system operates for a period of time, an active carbon sample at the bottom inside the titanium mesh tube, namely at a position close to the titanium mesh, and an active carbon sample on a near-surface layer, namely at a position close to the water surface, are taken out for carrying out specific surface area and biomass measurement so as to obtain an accumulation distribution condition of pollutants inside the constructed wetland; and the accumulation distribution condition of pollutants inside the constructed wetland can be changed by using the effect of an electric field generated by the electrons collected by the titanium mesh while electricity is generated and sewage is treated.

2. The method for changing filler pollutant accumulation of a constructed wetland according to claim 1, wherein
the diameters of the columnar active carbon (3) particles are 4 to 6 mm.

3. The method for changing filler pollutant accumulation of a constructed wetland according to claim 1, wherein
the external circuit is used for loading a resistor (7) of 1000 ohms.

4. The method for changing filler pollutant accumulation of a constructed wetland according to claim 1, wherein
the titanium wire of the external circuit is packaged through a silicone tube.

5. The method for changing filler pollutant accumulation of a constructed wetland according to claim 1, wherein the constructed wetland emergent aquatic plant is Myriophyllum aquaticum (6).

6. The method for changing filler pollutant accumulation of a constructed wetland according to claim 1, wherein the electron collection filler cathode is the titanium mesh (5) which is square with an opening at the top thereof.

* * * * *